D. ROSCHEN.
ANIMAL RELEASING DEVICE.
APPLICATION FILED JULY 26, 1909.
963,182.
Patented July 5, 1910.
2 SHEETS—SHEET 1.
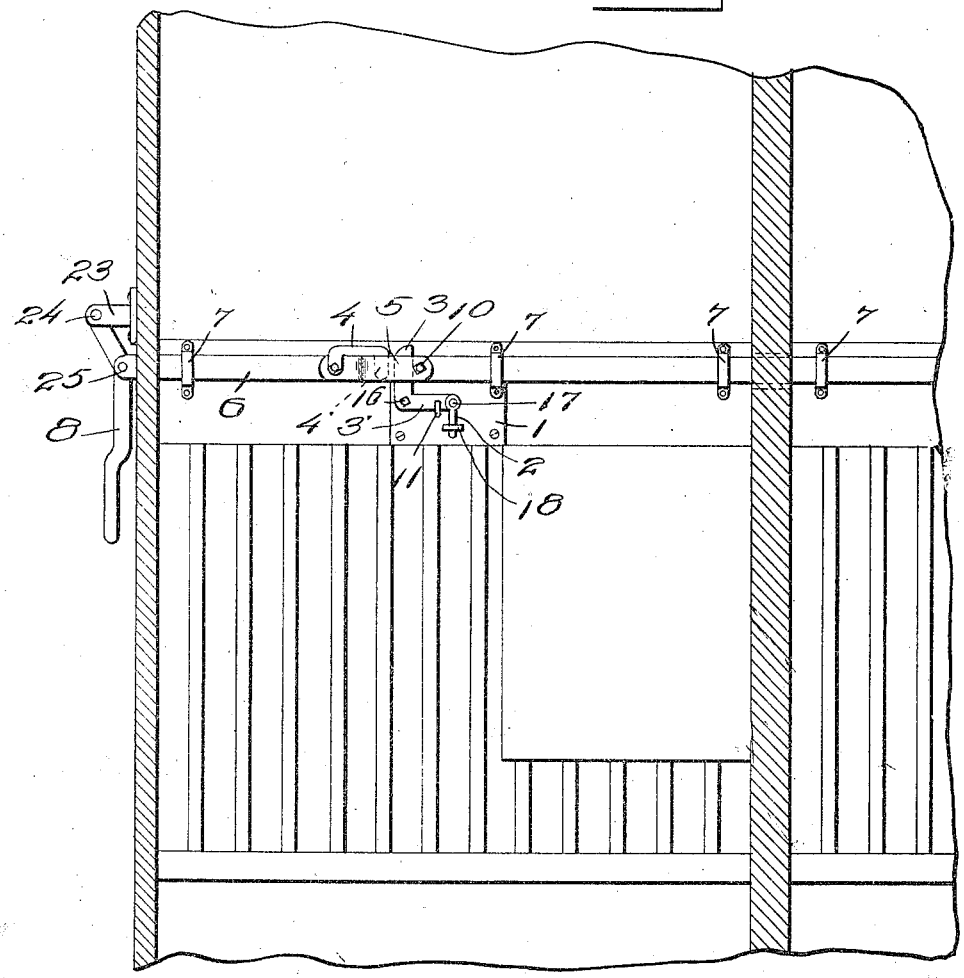
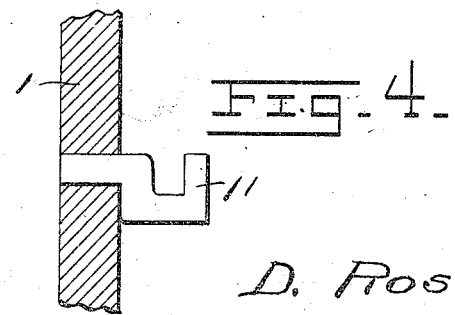

D. ROSCHEN.
ANIMAL RELEASING DEVICE.
APPLICATION FILED JULY 26, 1909.
963,182.
Patented July 5, 1910.
2 SHEETS—SHEET 2.
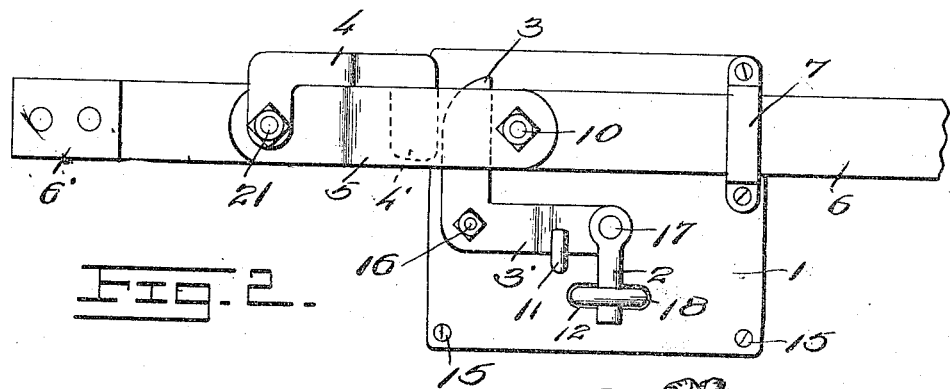
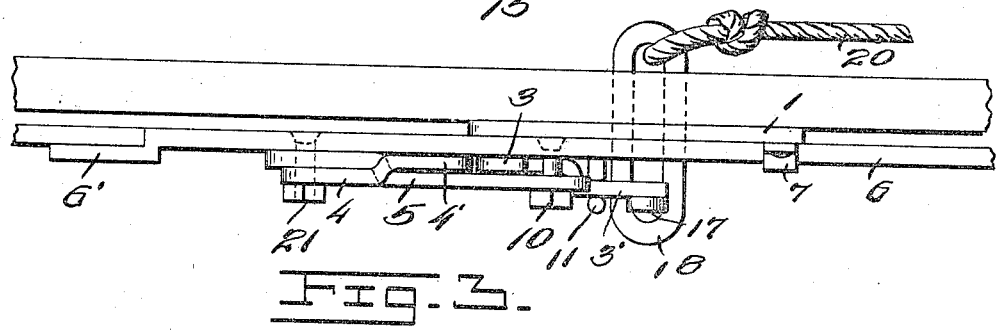
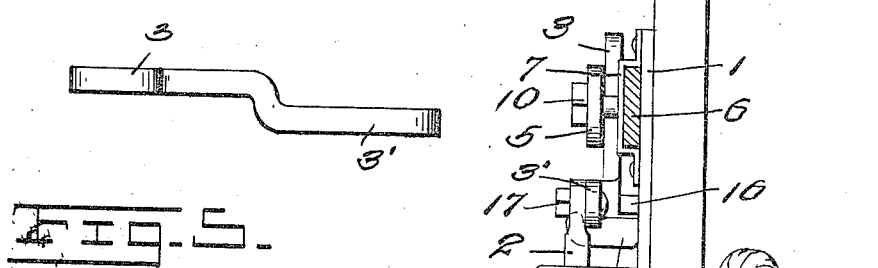
Witnesses
Inventor
D. Roschen
By Woodward & Chandlee
Attorneys

UNITED STATES PATENT OFFICE.

DIEDRICH ROSCHEN, OF LAKE CITY, MINNESOTA.

ANIMAL-RELEASING DEVICE.

963,182.      Specification of Letters Patent.      Patented July 5, 1910.

Application filed July 26, 1909. Serial No. 509,478.

*To all whom it may concern:*

Be it known that I, DIEDRICH ROSCHEN, a citizen of the United States, residing at Lake City, in the county of Wabasha and State of Minnesota, have invented certain new and useful Improvements in Animal-Releasing Devices, of which the following is a specification.

This invention relates to certain new and useful improvements in animal releasing devices.

The object of my invention is to provide a device designed to be secured to a stall, and arranged so that an animal secured within the stall may be released, in operating the mechanism from without the barn, so that in case of fire, the animal is free to escape.

Another object is to provide an easily operated device, by means of which the tie rope used to secure an animal in a stall can be instantly removed.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a portion of this specification, and in which like numerals of reference indicate similar parts in the several views, Figure 1 shows a fragmentary portion of a barn disclosing my releasing mechanism as attached to one of the stalls, Fig. 2 shows an enlarged detail of the releasing mechanism, Fig. 3 shows a top view of the releasing mechanism, Fig. 4 shows an enlarged detail of the stop hook, Fig. 5 shows a top view of the bell crank, Fig. 6 shows an end view of the releasing mechanism.

In stables and cow barns it is quite desirable that the animals should be so secured, that in case of fire they can instantly be released. In my present invention I provide a securing means, which includes the slotted base plate 1, which is fixed to a suitable part of the manger by means of the screws 15. This base plate carries the arbor 16, pivotally supporting a bell crank, having the vertically held member 3, and the approximately horizontally held member 3'. At the outer end I secure a pin 17 to the crank member 3', and this pin 17 supports the pivotally held bolt 2. As shown in Fig. 5, the end 3' is slightly offset while the outer edge of the end 3 is rounded.

Extending through the slot 12 within the base plate 1, is the ring 18 to which the tie strand 20 is fastened by means of which the animal is secured within the stall. Held above the base plate 1, by means of the ears 7, is the slide bar 6 which at one end is provided with the offset ear 6' having suitable openings so as to receive the next section of the slide bar, a plurality of such slide bars being used.

Secured to each slide bar 6, adjacent to the upstanding end 3 of the bell crank, is a yoke bar 5 secured by means of the pin 21 at one end, and by means of the pin 10 at the other end, as clearly disclosed in Fig. 2. Pivotally carried by the pin 21 is the dog 4, this dog having the head 4' which head is arranged to drop adjacent to and against the upstanding end 3 of the bell crank, as clearly disclosed. This dog 4 prevents any tilting or rocking movement of the bell crank unless the slide bars are actuated.

Secured to a suitable part of the barn, as shown in Fig. 1 the side of a stall, are the ears 23 carrying the pin 24 which pin supports at its upper end the operating lever 8, which intermediate its ends is pivotally secured by the pin 25 to one end of the slide bar 6.

The operation of my device is very simple. Should it be desired to release the animals within the stalls which are secured by means of the rings 12 carried by the bolts 2, the operator simply grasps the lever 8 and draws the same outward, which operation results in carrying the slide bars 6 in a horizontal direction, resulting in the upper ends 3 of the bell cranks being tipped downward to carry the bolts 2 out of the loops 18 so that the rings will drop off of the loops permitting the escape of the animals. The tie rope carrying ring members 18 are secured in first carrying the dog 4 upward so that the bell crank may be tilted. The bell crank is of course tilted a distance sufficient to permit the bolt 2 being carried entirely out of the path of the loop 18. In this position of the bolt the ring can be readily introduced or removed. In order to prevent the bell crank member 3' from being bent should the animal tug and pull at its tie rope, I provide the stop hook 11 which is arranged to be held immediately in front of this lever member 3' as clearly disclosed in Fig. 2.

The device is light, neat, simple and inexpensive, and can be secured to the stalls of any barn as ordinarily constructed. The animals can further be secured or released with ease, accuracy and despatch. Ordinarily in case of a fire, the animals are released by the removal of a halter from the neck of the animal. In my invention, however, the simple operation of the lever instantly releases all of the animals confined within the barn or cowshed.

The bell cranks are tilted by means of the pins 10 which are arranged to contact with the vertical members 3' of the bell cranks. These pins 10 also serve in securing the yoke bar, as disclosed.

And having thus described my said invention, what I claim as new and desire to secure by United States Letters Patent is:

1. In a device of the character described, the combination with a pivotally held bell crank having one of its members in a vertical position, a bolt pivotally carried by the remaining member of said crank, a loop to receive said bolt, a slide bar, a pin carried by said slide bar to contact with the vertical member of said crank, a dog pivotally carried by said slide bar and held adjacent to said vertical crank member, and a pivotally held operating lever carried by said slide bar.

2. In a device of the character described, the combination with a pivotally held bell crank, of a slide bar, a pin carried by said slide bar to tilt said bell crank, a dog carried by said slide bar to lock said bell crank, a loop, and a bolt carried by said bell crank and working within said loop.

3. In combination, a pivotally held bell crank, a slide bar, a pin carried by said slide bar to contact with said bell crank, a dog carried by said slide bar and contacting with said bell crank, a bolt carried by said bell crank, a loop to removably receive said bolt, and a lever connected to said slide bar.

4. The combination with a base plate, of an arbor, a bell crank pivotally carried by said arbor, a stop hook to hold said bell crank in one position, a loop, a bolt carried by said bell crank removably held within said loop, a slide bar, a pin carried by said slide bar to contact with said bell crank, a dog to lock said bell crank, and an operating lever secured to said slide bar.

In testimony whereof I affix my signature, in presence of two witnesses.

DIEDRICH ROSCHEN.

Witnesses:
JOHN ROSCHEN,
AUGUST TESSMAN.